United States Patent [19]

Chantry et al.

[11] Patent Number: 4,670,883
[45] Date of Patent: Jun. 2, 1987

[54] RARE-GAS-HALIDE LASER PERFORMANCE BY THE USE OF TWO HALOGEN DONORS

[75] Inventors: Pete J. Chantry; Louis J. Denes; Lawrence E. Kline, all of Pittsburgh, Pa.

[73] Assignee: The United States of America as represented by the Secretary of the Army, Washington, D.C.

[21] Appl. No.: 740,696

[22] Filed: Jun. 3, 1985

[51] Int. Cl.[4] .............................................. H01S 3/22
[52] U.S. Cl. ......................................... 372/57; 372/55
[58] Field of Search ................................ 372/57, 5, 55

[56] References Cited
U.S. PATENT DOCUMENTS 4,301,425 11/1981 Sze ......................................... 372/57

Primary Examiner—Gene Wan
Attorney, Agent, or Firm—Freddie M. Bush; James T. Deaton

[57] ABSTRACT

A method is disclosed for optimizing the performance of self sustained discharge rear gas halide lasers by using a gas mixture containing two halogen bearing gases. One of these gases is chosen for its attaching properties to optimize the operation of the discharge. The other gas is chosen for its weak attachment and its ability to form the excimer molecule in collisions with rare gas metastables. A representative strongly attaching halogen donor, $XH_n$, is selected from $F_2$ and $NF_3$, and a representative nonattaching halogen donor, $YH_n$, which may be weakly attaching, is selected from $CH_3F$, $CH_2F_2$, and $CHF_3$. The $XH_n$ gas has a concentration value from approximately 0.1 percent up to about 10 percent which is adjusted to maximize the production rate for excited and positively ionized rare gas atoms to yield the excimer state molecules $RgHn^*$, wherein Rg is a rare gas. The identity and amount of $XH_n$ are chosen to (i) ensure operation of the discharge at a field to pressure ratio E/N and current density which maximizes $Rg^*$ and $Rg^+$ production by appropriate control of the attachment loss rate of electrons, and (ii) to have the predominant attachment reaction be one which produces $Hn^-$ ions, rather than some other negative ion(s) so that $RgHn^*$ is produced by the recombination reaction $Rg^+ + Hn^- + M \rightarrow RgHn^* + M$, wherein M is a rare gas diluent to stabilize the recombination reaction.

3 Claims, 3 Drawing Figures

RARE-GAS-HALIDE LASER PERFORMANCE BY THE USE OF TWO HALOGEN DONORS

DEDICATORY CLAUSE

The invention described herein was made in the course of or under a contract or subcontract thereunder with the Government and may be manufactured, used, and licensed by or for the Government for governmental purposes without the payment to us of any royalties thereon.

BACKGROUND OF THE INVENTION

The rare gases or noble gases are members of the zero group or Group VIII A of the perioidic table. The rare gases include helium (He), neon (Ne), argon (Ar), krypton (Kr), xenon (Xe), and radon (Rn).

The discovery of rare-gas halide lasers opens up the field for efficient, high power coherent light sources in the ultraviolet (UV) portion of the spectrum. This portion of the spectrum being just beyond the violet or the short-wavelength side: generally 180–3900 angstroms.

Prior art in self-sustained discharge pumped rare gas halide excimer lasers exhibited lower than desired efficiencies and limited potential for scaling the high average power light sources.

The self-sustained discharge pumped rare gas-halide RGH) lasers that have been developed to date have used a single, strongly attaching halogen donor. The use of a single, strongly attaching halogen donor hinders optimization of the performance of these lasers because the halogen donor simultaneuosly affects laser performance in several ways. The various roles of the halogen donor are summarized in Table I. With a single halogen donor the halogen donor concentration which gives the best laser performance, $[XHn]_{opt}$, is determined by a trade-off between achieving high energy deposition, which occur at low values of $[XHn]$, and high excited rare gas-halide $(RHn^*)$ production efficiency, which occurs at high values of $[XHn]$. It should be noted that the values of $[XHn]$ range from $\sim 0.1\%$ up to $\sim 10\%$ for the purposes of this discussion. Furthermore, in many of the present RGH lasers most of the so-called "metastable channel" for $RHn^*$ production:

$$R^* + XHn \rightarrow RHn^* + X \tag{1}$$

is almost unused, and most of the $RHn^*$ production is via the other possible $RHn^*$ production channel, the "ion recombination channel":

$$R^+ + HN^- + M \rightarrow RHn^* + M \tag{2}.$$

TABLE I

| Energy Conversion Step | Controlling Factor(s) | Role of the Halogen Donor (XHn) |
|---|---|---|
| (1) Deposition of electrical energy in the discharge | Maximum energy and power limited by the glow-to-arc transition | Maximum power/energy increases as pulse length and XHn concentration increase |
| (2) Production of excited rare gas-halide (RHn*) | Production efficiency determined by the gas mixture | Production efficiency peaks at optimum XHn concentration |
| (3) Extraction of laser photons | Extraction efficiency determined by RHn* production rate and pulse length. | Extraction efficiency peaks at optimum pulse length, increases as RHn* |

TABLE I-continued

| Energy Conversion Step | Controlling Factor(s) | Role of the Halogen Donor (XHn) |
|---|---|---|
| | | production increases |

In equations (1) and (2) $R^*$ and $R^+$ are, respectively, excited rare gas atoms and rare gas ions. Hn is the halogen (e.g. F, Cl, etc.) and M is a third body needed to stabilize reaction (2).

A reaction scheme to achieve improved performance by enhancing the efficiency of the energy exchange or energy conversion step would be of major significance in the Rare Gas-Halide Laser Art.

Therefore, an object of this invention is to provide a reaction scheme or mechanism whereby improved performance is obtained by using two halogen donors instead of one.

A further object of this invention is to provide two halogen donors wherein each donor is selected to perform a separate specific function whereby the combined functions result in improved performance of a rare gas-halide laser.

SUMMARY OF THE INVENTION

The performance of rare-gas halide lasers is improved by using two halogen donors instead of one, each halogen donor being selected to perform a separate function. In particular one of the halogen donors serves to capture or attach electrons. In accordance with the method of this invention, the concentration of the capturing species is adjusted to maximize the production rate for excited and positively ionized rare gas atoms. The capturing species or the strongly attaching halogen donor also produces halogen negative ions which react with the rare gas positive ions to produce excited rare gas-halide molecules.

The other halogen donor is weakly attaching. This halogen donor is chosen to react with the excited rare gas atoms and produce excited rare gas-halide molecules via a second reaction channel.

Thus, two halogen donors are employed in an optimized concentration of each of the halogen donors in a self-sustained discharge pumped RGH laser. The reaction equations 1 and 2 below depict respectively a so-called "metastable channel" for $RHn^*$ production:

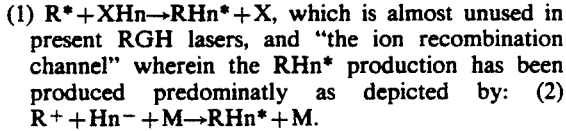

(1) $R^* + XHn \rightarrow RHn^* + X$, which is almost unused in present RGH lasers, and "the ion recombination channel" wherein the $RHn^*$ production has been produced predominatly as depicted by: (2) $R^+ + Hn^- + M \rightarrow RHn^* + M$.

In equations (1) and (2) $R^*$ and $R^+$ are, respectively, excited rare gas atoms and rare gas ions, Hn is the halogen (e.g. F, Cl, etc.) and M is a third body needed to stabilize reaction (2). M is a rare gas employed as a diluent.

In order to maximize net production of the excimer state molecules $RgHn^*$, and the resulting laser output energy, it is necessary to make the fullest possible use of both production channels, reactions (1) and (2), in the face of the severe limitations arising from the onset of the glow-to-arc transition. In order to achieve these results it is necessary to employ two different halogen donors, XHn and YHn; chosen to perform distinctly different functions in the discharge and laser kinetics. For convenience we shall refer to these as the attaching halogen donor, XHn, and the non-attaching halogen donor YHn, with the understanding that YHn may be weakly attaching. Also, Rg* and Rg+ refer to excited rare gas atoms and rare gas ions, respectively, as applied to production mechanisms of this invention.

The identity and amount of XHn are chosen to (1) ensure operation of the discharge at a field to pressure ratio E/N and current density which maximizes Rg* and Rg+ production by appropriate control of the attachment loss rate of electrons and (ii) have the predominant attachment reaction be one which produces Hn− ions, rather than some other negative ion(s) so that RgHn* is produced via reaction (2). On the other hand, the identity and amount of YHn are chosen such that it causes a minimum perturbation of the electron kinetics through such processes as attachment, ionization, and energy loss collisions, but provides a useful contribution to RgHn* production through reacton (1).

Examples of strongly attaching halogen donors are $F_2$ and $NF_3$, and examples of non-attaching halogen donors are $CH_3F$, $CH_2F_2$, and $CHF_3$.

DESCRIPTION OF THE PREFERRED EMBODIMENT

Figure 1:
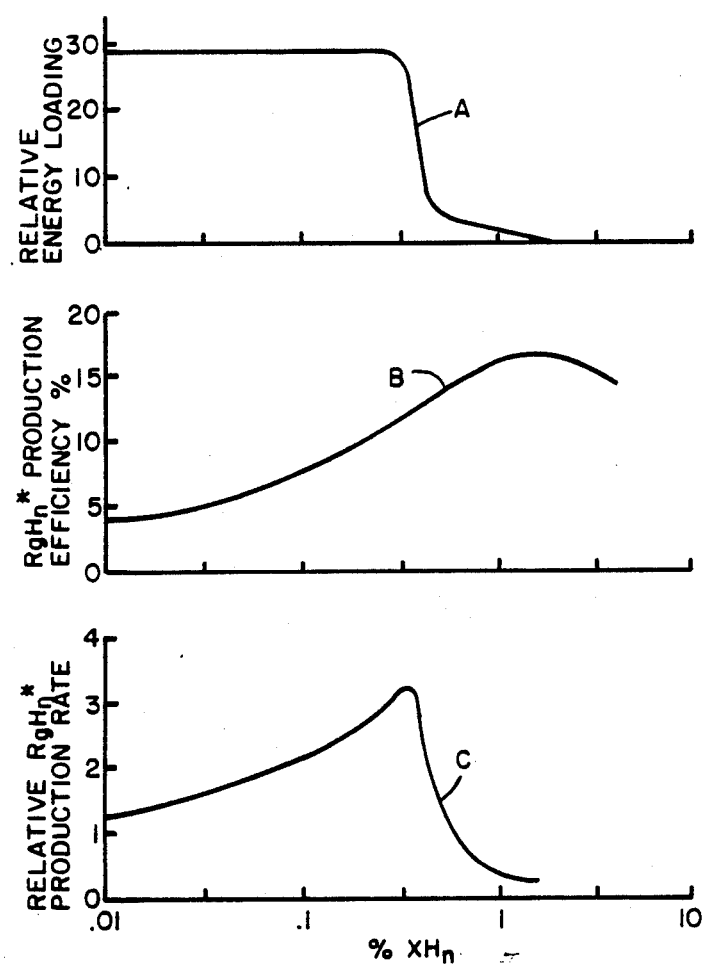
FIG. 1 of the drawing depicts representative curves a, b, and c which are energy loading, excited rare gas-halide production efficiency, and resulting relative production rate of excited rare gas-halide moleules.

Rare gas-halide lasers with improved efficiency provide high power coherent light sources in the ultraviolet (UV) portion of the spectrum.

In accordance with the method of this invention two halogen donors instead of one are provided, and each halogen donor is selected to perform a separate function. One of the halogen donors serves to capture or attach electrons. In accordance with this disclosed invention method, the concentration of the capturing species is adjusted to maximize the production rate for excited and positively ionized rare gas atoms. The capturing species or the strongly attaching halogen donor also produces halogen negative ions to produce excited rare gas-halide molecules.

Reaction equation (1), wherein R* and R+ are, respectively, excited rare gas atoms and rare gas positive ions, and Hn is the halogen (e.g. F, Cl, etc.), depicts a so-called "methastable channel" for RHn* production as follows:

$$R + XHm \rightarrow RHn^* + X. \tag{1}$$

Since two different halogen donors perform different functions in accordance with the disclosed method of this invention, XHn and YHn, are designations which are used to identify the attaching halogen donor and the non-attaching halogen donor respectively with the understanding that YHn may be weakly attaching. Also, Rg* and Rg+ are preferred designations when employing two different halogen donors in accordance with this invention.

The "ion recombination channel" is depicted by reaction equation (2) as follows:

$$R^+ + Hn^- + M \rightarrow RHn^* + M, \tag{2}$$

wherein R+, R and $H_n$ are the same as previously identified and M is a third body needed to stabilize reaction (2); M is a diluent of a rare gas.

Optimization of Attaching Halogen Donor

The identity of XHn is chosen from a knowledge of its attachment properties. In particular, it is important that the predominant negative ion produced in the attachment process be $Hn^-$. Of equal importance is that the intrinsic attaching strength (or attachment rate coefficient) lie in the appropriate range. As discussed below, the available experimental and theoretical data suggests that there is an optimum attachment rate for RgHn* production.

If the attachment rate coefficient is too low the required density of the attaching gas will be undesirably high, causing a significant fraction of the discharge energy to be diverted away from Rg* and Rg+ production.

If the attachment rate coefficient $k_a$ is too high the required density of the attaching gas will be so low that a significant fraction of the attaching gas is consumed in one discharge pulse. It can be shown that the upper limit on $k_a < (\tau_p n_e)^{-1}$, where $\tau_p$ is the discharge pulse length and $n_e$ is the discharge electron density. Since the product $\tau_p n_e$ is also an approximate measure of the discharge energy loading the inequality $k_a < \tau_p n_e$ implies that the maximum permissible value of $k_a$ is inversely proportional to the energy loading, independent of pulse length. It is also interesting to note that for strongly attaching gases such as $F_2$ and $NF_3$ $k_a \sim 10^{-9}$ $cm^3/sec$, and the XHn density can be significantly depleted during a 300 ns pulse with $n_e \sim \times 10^{14} cm^{-3}$.

The amount of XHn is chosen to maximize the rate at which the discharge is producing excited rare gas halide molecules (RgHn*). This optimization involves a trade-off between (i) maximizing the electrical energy deposited into the discharge which decreases with increasing XHn concentration as shown by curve a of FIG. 1, and (ii) maximizing the efficiency of producing Rg* and Rg+ and the RgHn* production efficiency. This production efficiency increases with increasing XHn concentration as shown by curve b of FIG. 1. The resulting curve of RgHn* production rate is shown in curve c of FIG. 1. Note that there is an optimum XHn concentration. The actual value of the optimum concentration will depend on the discharge pulse length and the particular gas mixture, but the qualitative behavior will be of the type shown in FIG. 1, curves a, b, and c.

Figure 2:
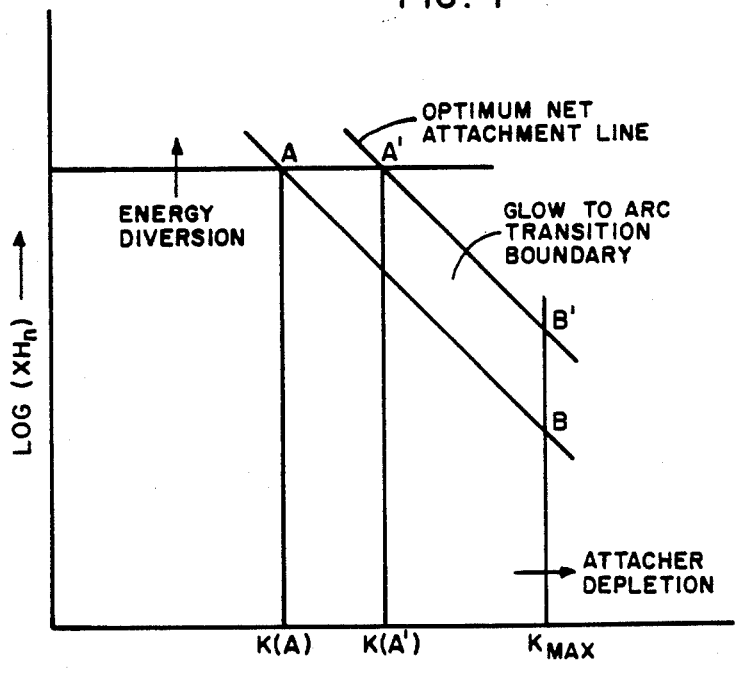
FIG. 2 depicts the factors controlling the choice of the attaching halogen donor XHn, and the optimum amount of XHn to use.

The overall situation regarding the choice of the attaching halogen donor is shown in FIG. 2, which represents the limiting criteria discussed above on a log-log plot of the amount [XHn] versus the intrinsic attaching strength, represented by $k_a(XHn)$. On this plot the optimum net attachment rate, determined from data of the type shown by curve b of FIG. 1, corresponds to a fixed value of the product $k_a[XHn]$, which appears on this plot as a line of slope −1. A similar line represents the limitation imposed by the glow-to-arc transition discussed in relation to curve a of FIG. 1.

The limitation on $k_a$ imposed by the requirement that XHn not be significantly depleted during the discharge pulse appears as a vertical line in FIG. 2. The requirement that the halogen donor not divert discharge energy from the production of Rg* and Rg+appears on the plot as a limitation on the concentration of [XHn], i.e., as a horizontal line.

The most desirable operating point is on the straight line represesnting the optimum net attachment rate, between points A' and B' of FIG. 2. If this is possible, the corresponding optimum range of $K_a$ is $k(A') < k_a$ $<k_{max}$. The amount of (XHn) is then chosen to place the operating point on the line A'B'. It is likely, however, that the discharge cannot be operated with the optimum net attachment rate, given by curve b of FIG. 1, because of the pre-emptive restriction from the glow-to-arc transition. This is the situation represented in FIG. 2. In this situation the operating point lies on, or just below the line AB. In this case the same upper limit on $k_a$ applies, but the lower useful limit is extended to $k(A)$. Knowing the value of $k_a$ we can compute the required density of [XHn] to place the operating point in the required region, just below line AB.

It must be realized that FIG. 2 is not a "universal plot". It will depend quantitatively on the particular system under consideration. For any given system, a quantitative figure can be constructed from a knowledge of the individual reaction rates and the desired energy loading of the discharge.

Choice of Non-Attaching Halogen Donor

Using the above criteria the production rate of Rg* and Rg+ in the discharge can be maximized, and provided the attaching halogen donor has been chosen properly the negative ion resulting from the attachment is Hn−, ensuring that the ion recombination channel is properly utilized for production of RgHn* excimers. It is likely that the chosen attaching species XHn will also contribute to excimer production via reaction (1), but we stress that the identity and amount of XHn are not chosen with this in mind. It is unlikely that reaction (1) involving XHn will fully utilize the Rg* metastables produced by the discharge. The choice of the identity and amount of the non-attaching halogen donor YHn is made so as to ensure that the Rg* are fully utilized through the equivalent reaction.

$$Rg^* + YHn \rightarrow RgHn^* + Y \qquad (3)$$

Figure 3:
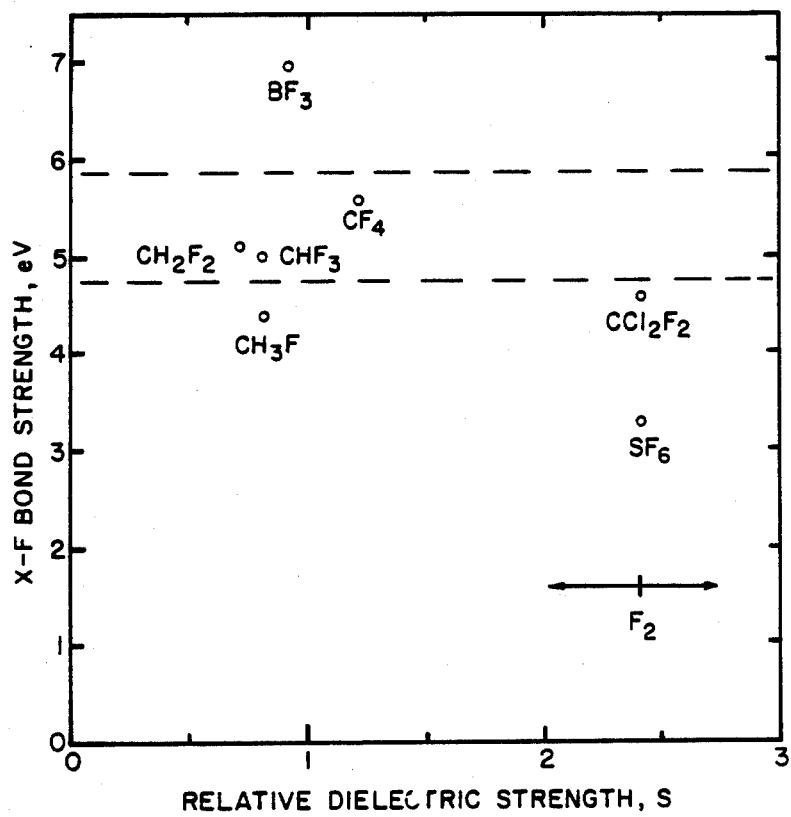
FIG. 3 is a plotting of bond strength of fluorine atom versus the dielectric strength (relative to $N_2$) for various candidate F-donor gases.

The choice of YHn is based on the requirement that it have an adequate rate coefficient for reaction (3), but not be an attaching gas. Direct experimental data on both properties can of course be utilized where available to aid in the choice. When such data is not available the candidate gas can be screened by consideration of whether or not reaction (3) is energetically possible, and by consideration of the dielectric strength, which has been measured for many gases. This method of screening is illustrated in FIG. 3, where various gases are plotted as points showing their respective dielectric strengths relative to $N_2$ and the halogen binding energy in this case fluorine. For reaction (3) to be exothermic we require that $$D(YHn) < D(RgHn^*)$$

which for the case of XeF* means that $D(RgHn^*) = 4.7$ eV. Similar values apply for other RGH systems.

From the point of view of the present considerations the most favorable molecules for use as non-attaching halogen donors will be situated towards the origin of the figure. Any molecule having an interestingly low halogen bond strength is a viable candidate provided it has poor dielectric strength, which is commensurate with weak attachment. Thus, it has been discovered that the YHn molecule having, for example, based on (X-F) bond strength, in eV, should have a value between about 4 and 5, and YHn must also have a poor dielectric strength of the fluorine relative to $N_2$ from about 0.5 to about 1.5. Thus, of the gases shown in FIG. 3, $CH_3F$ represents the best candidate, while $CH_2F_2$ and $CHF_3$ are considered to be candidates which are useful.

We claim:

1. A method of operating a self-sustained discharge pumped rare gas-halide laser employing a rare gas selected from the group consisting of helium, neon, argon, krypton, xenon, and radon; a single strongly attaching halogen donor, XHn, which functions in the discharge and laser kinetics to simultaneously affect laser performance in achieving high energy deposition at low concentration values of XHn and high excited rare gas-halide production efficiency at high concentration values of $XH_n$, said X of XHn selected from the group consisting of a positive interger of one, N, S, B, a carbon atom, and a carbon atom containing one or more atoms of a halogen, and said Hn selected from the group consisting of one or more atoms of Cl, F, Br, or I or a diatomic molecule of the same when said X is a positive interger of one; and M as a diluent gas selected from the rare gases consisting of helium, neon, argon, krypton, xenon, and radon, and wherein in operating said method the production of rare gas excimers, RHn*, is produced substantially by the reaction production channel defined as the ion recombination channel:

$$R^+ + Hn^- + M \rightarrow RHn^* + M.$$
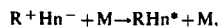

wherein R+ an Hn− are, respectively rare gas ions and halogen ions, and wherein the production channel defined as the metastable channel:

$$R^* + XHn \rightarrow RHn^* + X.$$
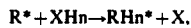

is almost unused for RHn* production, wherein R* are excited rare gas atoms, the improvement in said method to maximize net production of the excimer state molecules RgHn* achieved by using a gas mixture containing two halogen bearing gases, XHn and YHn, said XHn being as defined hereinabove and wherein said XHn is chosen for its strongly attaching properties to optimize the operation of the discharge, said XHn also being chosen on the basis of its attachment rate coefficient, $k_a$, having a predetermined value range of $k_a$ which lies between a minimum value and a maximum value of $k_a$, said minimum value of $k_a$ providing a control to the maximum concentration or density of said XHn required for maximum production of excited rare gas atoms or metastables and rare gas ions, Rg* and Rg+, respectively in said discharge and said maximum value of $k_a$ providing a control to the minimum concentration or density of said XHn required to prevent XHn depletion in said discharge; said YHn being a non-attaching halogen having a low halogen bond strength and a poor dielectric strength, said halogen bond strength being less than about 5eV and said poor dielectric strength relative to $N_2$ ranging from about 0.5 to about 1.5, said Hn is as defined hereinabove, said Y of said YHn is selected from Ch, Ch$_2$, and CH$_3$, and wherein said YHn is selected for its weakly attaching properties and its ability to form excimers in collision with Rg* metastables produced by the discharge in the equivalent reaction to said metastable channel:

$$Rg^* + YHn \rightarrow RgHn^* + Y,$$
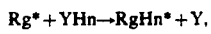

to fully utilize the Rg* metastables produced in said discharge and to make the fullest possible use of both of said production channels as a result of employing said XHn and YHn in said self-sustained discharge pumped rare gas-halide laser.

2. The improvement in said method to maximize net production of the excimer state molecule RgHn* as defined in claim 1 wherein said X of said XHn is the positive interger one and said Hn is $F_2$ and said Y of said YHn is $CH_3$ and said Hn is F.

3. The improvement in said method to maximize net production of the excimer state molecule RgHn* as defined in claim 1 wherein said X of said XHn is N and said Hn is $F_3$ and said Y of said YHn is $CH_3$ and said Hn is F.

* * * * *